US007941839B2

(12) United States Patent
Siegrist et al.

(10) Patent No.: US 7,941,839 B2
(45) Date of Patent: May 10, 2011

(54) COUNTERMEASURES TO AUTOMATED METHODS AND PROCESSES FOR ESTABLISHING MEDIA STREAMING CONNECTIONS THROUGH FIREWALLS AND PROXY SERVERS

(75) Inventors: Joseph Siegrist, Vienna, VA (US); Ryan Cruse, Montclair, VA (US)

(73) Assignee: Art Technology Group, Inc., Cambridge, MA (US)

( * ) Notice: Subject to any disclaimer, the term of this patent is extended or adjusted under 35 U.S.C. 154(b) by 192 days.

(21) Appl. No.: 12/110,020

(22) Filed: Apr. 25, 2008

(65) Prior Publication Data

US 2008/0229404 A1 Sep. 18, 2008

Related U.S. Application Data

(62) Division of application No. 10/198,664, filed on Jul. 18, 2002, now Pat. No. 7,367,051.

(51) Int. Cl.
*G06F 15/16* (2006.01)
(52) U.S. Cl. ............................... 726/11; 726/12; 726/13
(58) Field of Classification Search .................. 726/2–4, 726/11–12, 14–15; 709/228; 713/150, 152–154
See application file for complete search history.

(56) References Cited

U.S. PATENT DOCUMENTS

| 6,104,716 | A | 8/2000 | Crichton et al. |
| 6,502,135 | B1 * | 12/2002 | Munger et al. ................. 709/225 |
| 6,880,090 | B1 * | 4/2005 | Shawcross ....................... 726/14 |
| 7,367,051 | B1 | 4/2008 | Siegrist et al. |

OTHER PUBLICATIONS

R. Fielding, et al., "Hypertext Transfer Protocol—HTTP/1.1", http://www.w3.org/Protocols/rfc2616/rfc3616.html, Jun. 1999.

* cited by examiner

*Primary Examiner* — Hosuk Song
(74) *Attorney, Agent, or Firm* — Squire, Sanders & Dempsey (US) LLP

(57) ABSTRACT

A streaming media application attempting to establish a streaming media connection first attempts to establish the connection directly using a format such as UDP. If no direct connection can be established, the media application attempts to establish a connection through a proxy server using proxy server information obtained from installed software components such as browsers that manage Internet connections. If necessary, an auto configuration web page is utilized to obtain the proxy server address. The invention also includes methods for blocking streaming media connections.

11 Claims, 2 Drawing Sheets

COUNTERMEASURES TO AUTOMATED METHODS AND PROCESSES FOR ESTABLISHING MEDIA STREAMING CONNECTIONS THROUGH FIREWALLS AND PROXY SERVERS

This application is a Division of U.S. patent application Ser. No. 10/198,664, filed Jul. 18, 2002, now allowed, which claims priority to U.S. Provisional Patent Application Ser. No. 60/305,886, filed Jul. 18, 2001, the contents of both of which are hereby incorporated by reference herein.

BACKGROUND

Users of the World Wide Web and other packet-based networks frequently engage in communications and entertainment activities that require the establishment of one-way or two-way media streaming connections between a terminal device (such as a personal computer) and a server or telecommunications device (such as a telephone, media gateway, private branch exchange, or media server). For example, the assignee of the present invention, eStara Inc., provides Internet-telephony services to connect web site users and e-mail users to commercial call centers by enabling their personal computers to behave as speakerphones and establishing voice-over-Internet connections through the public switched telephone network.

Many users who desire media streaming services connect through networks that utilize firewalls and proxy servers for information security. Firewalls frequently block media streaming protocols (e.g., the Universal Datagram Protocol-UDP) while supporting web protocols (e.g., the HyperText Transfer Protocol-HTTP). Proxy servers complement firewalls by facilitating connections for authorized purposes while shielding personal computers and other devices from a direct connection to the public Internet.

Users who desire access to media streaming applications may be prevented from using these applications by the need to determine a variety of network browser security configuration settings and to modify these settings to permit media streaming connections. What is needed is an apparatus and a method for a network-based or computer-based application to determine firewall and proxy server configuration settings and negotiate an appropriate connection with the end user's computing device and/or a proxy server automatically.

SUMMARY

The present invention teaches various methods and processes for establishing a media streaming or other connection by an application that may be confronted by an unknown firewall and/or proxy server configuration. It includes various methods to determine what connections are possible and, when necessary, the logic for negotiating a connection with a proxy server.

In addition, the invention teaches a set of countermeasures that may be employed to block the establishment of media streaming connections by such methods and processes, thereby enhancing the security environment.

BRIEF DESCRIPTION OF THE FIGURES

A more complete appreciation of the invention and many of the attendant advantages and features thereof will be readily obtained as the same becomes better understood by reference to the following detailed description when considered in connection with the accompanying drawings, wherein.

DETAILED DESCRIPTION

The present invention will be discussed with reference to preferred embodiments of Internet telephony connections as the invention is believed to be particularly well suited for this field. The preferred embodiments discussed herein should not be understood to limit the invention.

For ease of understanding, certain method steps are delineated as separate steps in a specific sequence; however, these steps should not be construed as necessarily order dependent in their performance.

Further, certain software components and protocols are described to make the examples more concrete, but the teachings of the present invention are not limited to such components and protocols, and may be applied to other existing and new software components and protocols as computing evolves in the future.

Figure 1:
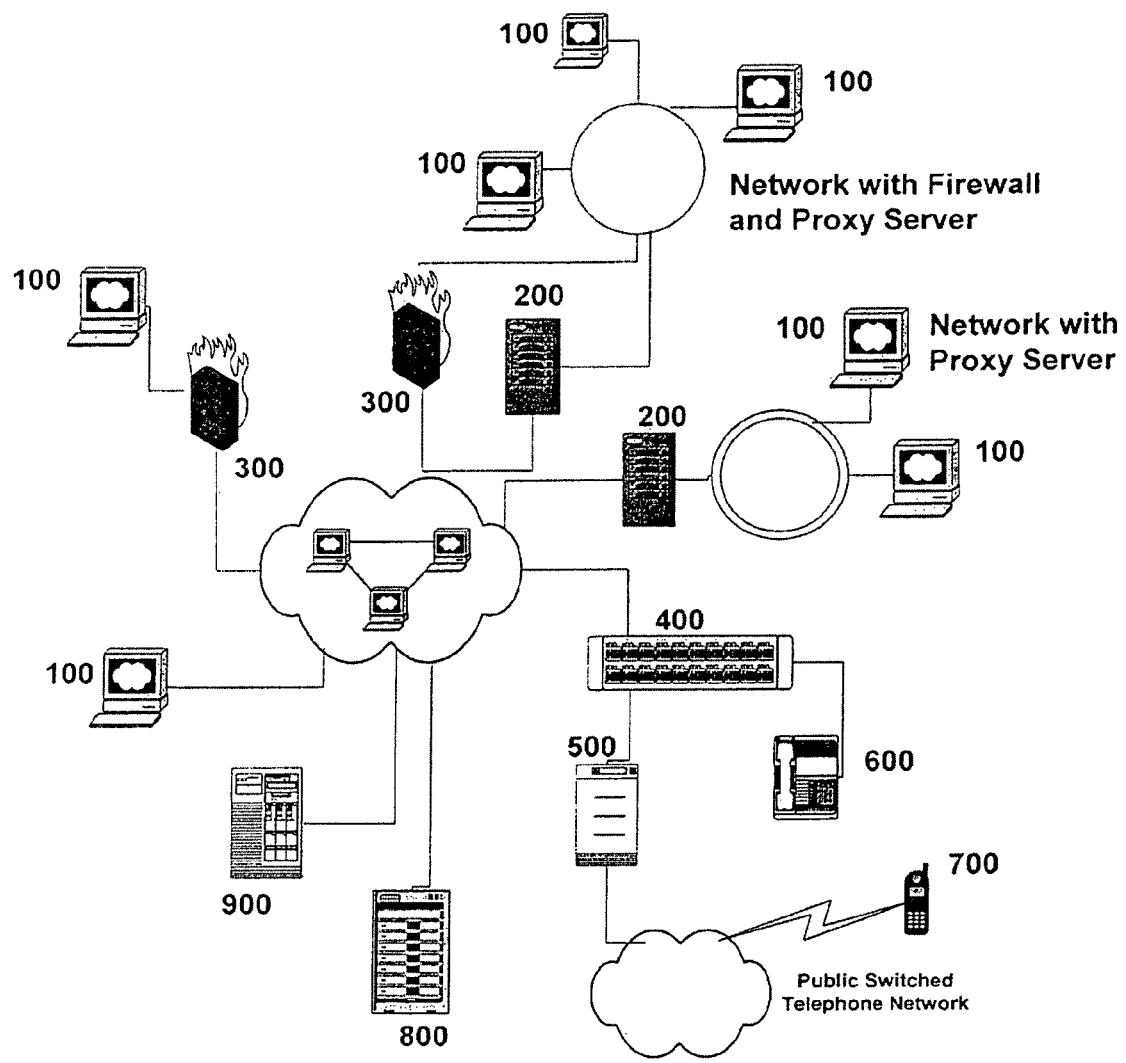
FIG. 1 is a block diagram illustrating an exemplary network in which security is provided by firewalls and proxy servers.

Before proceeding further, it is necessary to describe illustrative configurations of network components that may be involved in a media streaming application. Referring now to the drawings, FIG. 1 illustrates an exemplary packet-based network in which end users employ various computing devices with different browsers and operating systems (100), and in which security is provided by various proxy servers (200) and firewalls (300). Some attached networks include both servers and firewalls, others may have either firewalls or servers, and still others may have neither. Sometimes proxy servers and firewall are combined in a single server.

Various streaming-media related devices may be attached to the packet-based inter-network, as illustrated by a media gateway (400), a telephone switch (500), an internet telephone (600), a cell phone (700) connected via the public switched network, a media server (800), and a broadcast media server (900). All the devices in this figure are for illustration purposes only, since many more types of devices can be and indeed already are interconnected via large-scale packet-switched networks such as the Internet, private networks, and virtual private networks. When a "generic" media application residing on a computing device (100) confronts an unknown environment in which various firewalls or proxy servers (200, 300) may block media streaming with the various media devices (400, 500, 600, 700, 800, 900), the media application must successfully detect the blocking components and negotiate a connection through them.

Figure 2:
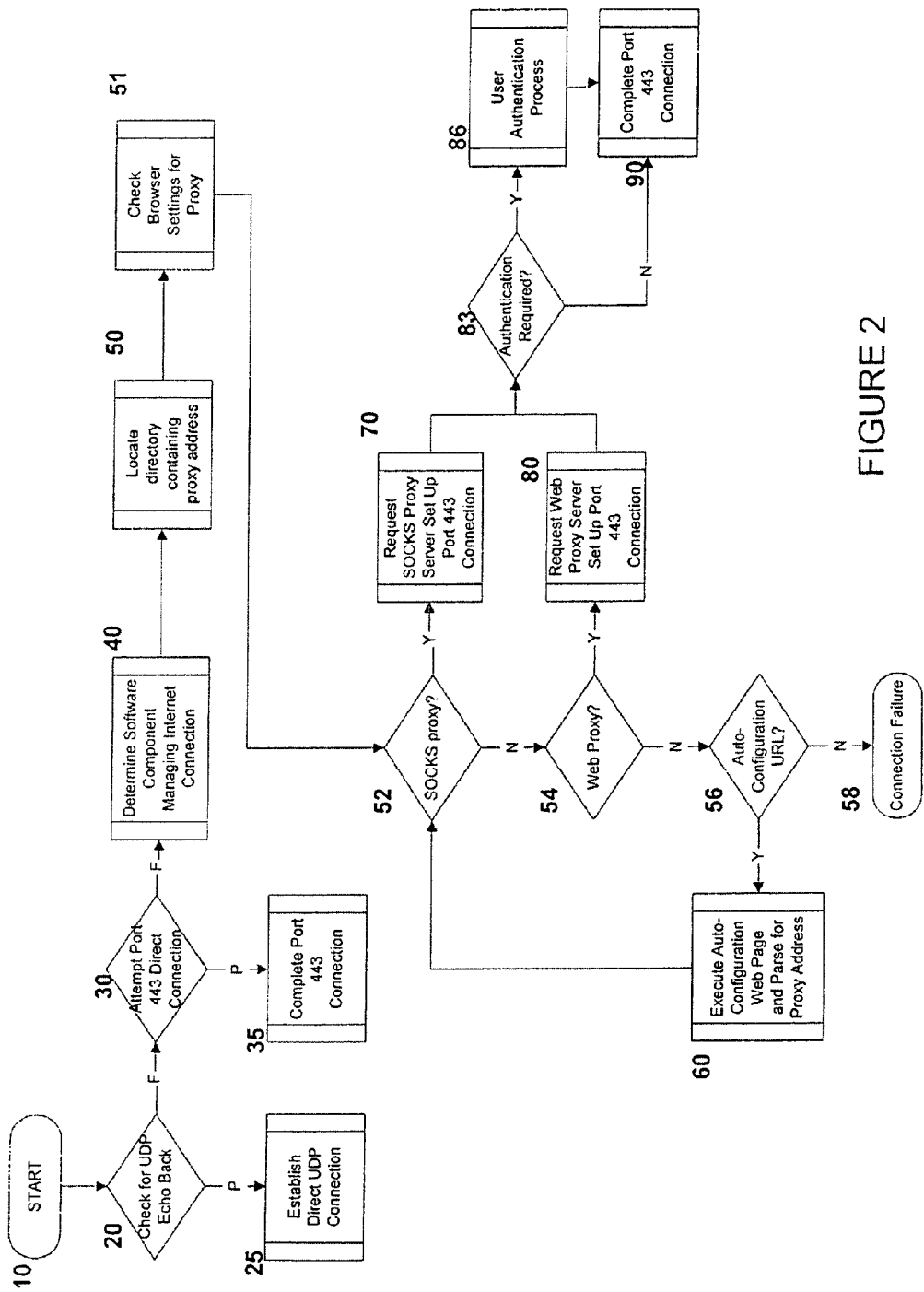
FIG. 2 is flow chart illustrating a method for an application to establish a media streaming connection when confronted by an unknown firewall and proxy server configuration.

Referring now to FIG. 2, it is assumed that the end user's computing device has resident in memory a media application which must establish a media streaming connection to outside devices in order to function. (This application may have been downloaded from the network, or pre-installed by other means; it may take several forms, such as an executable program, a browser script, or some other executable software object.) FIG. 2 illustrates the steps taken by the media application to establish a connection according to a preferred embodiment of the invention.

In the preferred embodiment described here and depicted in FIG. 2, the media streaming connection desired is a point-to-point UDP connection between the end user's computer and remotely located media gateway to carry two-way audio (voice) streams. The same principles would apply to other media, other protocols, other devices, and unidirectional streaming.

The media application begins by testing its ability to establish a direct UDP connection to the target device by sending out the appropriate UDP packets addressed directly to that device and requesting an echo back (step 20). If the echo back is received prior to a pre-programmed timeout interval, the media application proceeds to establish a direct UDP connection with the target device (step 25).

If a firewall blocks the UDP echo back packets, the test fails and the media application determines whether an alternative protocol connection can be made directly. For a media streaming application, one preferred alternative protocol is HTTPS, which is assumed to contain encrypted payloads and is supported by many firewalls. Therefore, in the preferred embodiment the media application tests for the ability to create a direct HTTPS connection (step 30) (implemented using Port 443 in accordance with IETF standards). In other embodiments, connections using other protocols such as HTTP (on Port 80) may be attempted. If the HTTPS connection test succeeds, the media application negotiates a direct HTTPS connection with the target device (step 35) and sends and receives UDP packets on the HTTPS ports.

If no direct connection can be made, the media application infers that a proxy server is present and active. The media application then attempts to determine the connection paths available by determining the software components (e.g., browsers) that are managing the active Internet connection and/or are installed on the user's computer (step 40) so that configuration information stored by these software components can be examined to obtain information, such as proxy server addresses, required to utilize the connection paths.

In a preferred embodiment, the media application is activated when the end user clicks on a web icon displayed within a web browser, causing an applet to download and start the media application. The applet is able to pass the media application parameters including the active browser type. The applet may determine the browser type by examining, for example, the navigator.appName and/or navigator.userAgent variables. In other embodiments, other modes of discovery would be employed based on the methods used to start up the media application. In still other embodiments, the browser type is simply assumed and/or multiple attempts at obtaining proxy information from configuration information from different software components to establish a connection path using different assumptions are made. For example, a first assumption might be Microsoft Internet Explorer and a second Netscape Navigator. If the first assumption fails (that is, the configuration information corresponding to Microsoft Internet Explorer cannot be found and/or a connection through the proxy server indicated by the configuration information cannot be established) no harm is done; steps 40 et seq. are simply repeated utilizing data from different software components until a connection is established or until all attempts at establishing a connection have been exhausted.

The media application first locates the directory containing the proxy address and other information (step 50). For some software components, such as Microsoft Internet Explorer 5.0, this may be a fixed location—in these cases, the media application can reference pre-programmed locations in its program logic. For other software components, such as Netscape Navigator 5.0, the directory location may be configurable, so the media application must query the software component to determine the directory location and store it in memory. Once the directory has been located at step 50, the media application accesses the directory containing the proxy server address and other information to determine the browser settings for the proxy server (step 51).

If the browser proxy settings indicate that there is a SOCKS proxy server present (step 52), the media application requests that the SOCKS proxy server set up a Port 443 (HTTPS) connection with the target device (70).

If no SOCKS proxy server is present, the media application then examines the browser proxy settings to determine whether there is a web proxy (an HTTP or HTTPS address) (step 54). If so, the media application requests that the web proxy server set up a Port 443 (HTTPS) connection (step 80).

If no web proxy server is found at step 54, the media application next examines the browser settings to determines whether there is an auto-configuration URL as a proxy server address (step 56). If no auto-configuration URL is found, a connection failure is declared at step 58. At this point, steps 50 et seq. may be repeated assuming a different browser or the process may halt if all possible attempts at establishing a connection have been made.

If there is an auto-configuration URL present at step 56, the media application executes an auto-configuration web page and parses the results for a proxy server address (step 60). If the address points to a SOCKS proxy server at step 52, the media application requests that the SOCKS proxy server set up a Port 443 (HTTPS) connection with the target device (step 70). If the address points to a web proxy server at step 54, the media application requests that the web proxy server set up a Port 443 (HTTPS) connection (80).

Some proxy servers require that users authenticate themselves prior to setting up a new connection. If the proxy server requires authentication (step 83), the media application must support or invoke a user authentication process to provide a window or screen on which the user can enter the required authentication information (e.g., user name, password, and domain) (step 86). When the authentication is completed, or immediately if no authentication is required, the proxy server sets up the requested connection to the target device (step 90).

Countermeasures

It is readily apparent to one skilled in the art that, having constructed the logic needed for a media application to automatically establish a media streaming connection through a firewall and/or proxy server, one can immediately develop countermeasures to defeat this logic. Accordingly, this invention also teaches countermeasures that can defeat the described methods and processes.

At the most fundamental level, if a firewall and proxy server are configured to totally block HTTPS traffic the invention as described will not function as intended. Along the same lines, if a firewall "sniffs" the HTTPS packets to determine whether unencrypted UDP packets are present and blocks them, the invention as described will not function as intended. Packets may be recognized as containing streaming media by comparing their format to the format of known streaming media formats.

Next, if the browser and operating system are able to shield proxy server configuration information from applications then invention as described will not work. The proxy setting information could be stored with access limited to only authorized applications, and/or to the initial startup of the browser. These restrictions could be applied to both stored addresses and to the auto-configuration addresses.

Lastly, network software components could be programmed to spoof the behavior of the target device to gather data for security officials to investigate potentially unauthorized applications that attempt to establish new media streaming connections. For example, the auto-configuration web page could return a decoy proxy server address and this server could mimic the connection startup process and store information gleaned from packets transmitted by the media application.

What is claimed is:

1. A method for blocking a streaming media connection between a first device inside a firewall and a second device outside a firewall comprising the steps of:
   comparing at the firewall a format of unencrypted payloads of packets being sent from the first device via an HTTPS connection to streaming media formats without decrypting the payloads of the packets; and
   blocking at the firewall unencrypted packets with payloads having formats corresponding to streaming media formats.

2. The method of claim 1, wherein the streaming media connection is a UDP (user datagram protocol) connection.

3. A method for blocking a connection comprising the steps of:
   returning a decoy proxy server address from an auto-configuration web page; and
   comparing addresses of packets received at a firewall to the decoy proxy server address and blocking packets addressed to the decoy proxy server address;
   wherein the connection is a streaming media connection.

4. The method of claim 3, wherein the streaming media connection is a UDP (user datagram protocol) connection.

5. A firewall device for blocking a streaming media connection comprising:
   a memory; and
   a processor connected to the memory;
   wherein the processor is configured to perform the steps of:
      comparing a format of unencrypted payloads of packets being sent from the first device via an HTTPS connection to streaming media formats without decrypting the payloads of the packets; and
      blocking unencrypted packets with payloads having formats corresponding to streaming media formats.

6. The device of claim 5, wherein the streaming media connection is a UDP (user datagram protocol) connection.

7. The device of claim 5, wherein the device is further configured as a proxy server.

8. A device for blocking a connection comprising the steps of:
   a memory; and
   a processor connected to the memory;
   wherein the processor is configured to perform the steps of:
      returning a decoy proxy server address from an auto-configuration web page; and
      comparing addresses of packets received at a firewall to the decoy proxy server address and blocking packets addressed to the decoy proxy server address;
      wherein the connection is a streaming media connection.

9. The device of claim 8, wherein the streaming media connection is a UDP (user datagram protocol) connection.

10. The device of claim 8, wherein the device is configured as a firewall.

11. The device of claim 8, wherein the device is configured as a proxy server.

* * * * *